Oct. 30, 1945.  J. M. TYRNER  2,388,023
ELECTRIC CIRCUIT CONTROLLER
Filed Oct. 16, 1943  4 Sheets-Sheet 1

INVENTOR.
Joseph M. Tyrner
BY
Charles W Neill
ATTORNEY

Oct. 30, 1945.  J. M. TYRNER  2,388,023
ELECTRIC CIRCUIT CONTROLLER
Filed Oct. 16, 1943  4 Sheets-Sheet 2

INVENTOR.
Joseph M. Tyrner
BY
Charles W. Neill
ATTORNEY

Patented Oct. 30, 1945

REISSUED
AUG 12 1947

2,388,023

UNITED STATES PATENT OFFICE 2,388,023

ELECTRIC CIRCUIT CONTROLLER

Joseph M. Tyrner, New York, N. Y.

Application October 16, 1943, Serial No. 506,533

15 Claims. (Cl. 172—239)

This invention relates to apparatus for controlling the supply of power to an electric circuit.

The simplest apparatus to provide variable D. C. voltage is the potentiometer. The drawback of this device is its inherently very low efficiency, which prohibits its use for anything else but supply of extremely low amperages.

Theoretically, at least, it would be possible to take a variable voltage from a third brush between the main brushes on a rotating D. C. armature. By moving this third brush from one main brush to the other, any voltage would be available, but such a device is not practical because of commutation difficulties.

It is an object of this invention to provide improved apparatus for obtaining variable voltage. The invention includes what is in effect a rotary potentiometer, but the construction is such that a third brush acts as if it were moved from one line brush toward another, though actually it is stationary between the line brushes and the voltage division is effected by change in the magnetic field distribution.

The rotary potentiometer or converter of this invention is a direct current machine with three axes, a three pole armature, and three brushes. Because of the triplicity of elements, the machine has been called the "Triodyne." This machine can also be built with six, nine, or any multiple of three poles for the field and armature, the principle of operation being unchanged. A three pole machine is the simplest embodiment of the invention and such a machine will be described in this specification, though for units of large size, a six pole machine has the advantage of magnetic balance.

The Triodyne has three brushes, the first and second of which are connected with a power line. A secondary voltage is generated between the second and third brushes, and a tertiary voltage is generated between the first and third brushes. Both the secondary and tertiary voltages can be given in value between zero and a voltage slightly less than the line voltage by merely adjusting the excitation of one of the Triodyne poles. This adjustment is preferably obtained with a small rheostat.

The field of the motor to be controlled is preferably connected directly across the power line and the armature is connected across either the second and third or third and first brushes of the Triodyne. According to one feature of the invention, the Triodyne voltage is made to vary with the load so as to give the motor the characteristics of a series motor for starting, even though the field is excited directly from the line. A reversing switch located between the motor field and the power line is used for reversing the direction of rotation of the motor. The Triodyne may also be designed to deliver a voltage that is independent of the load and the motor can be connected with the power output of the Triodyne in the same manner as a motor is usually connected with a power line.

The Triodyne provides the most flexible control possible and without the use of switches or any impedances or rheostats other than the small control rheostat for the field current of the control pole of the Triodyne.

Very high efficiency is obtained because the Triodyne always draws only as much current from the line as is necessary to supply the motor demand and the iron, copper, and windage losses of the Triodyne itself. Another advantage that makes for high efficiency of the combination is that the motor can be used effectively for regenerative braking, the Triodyne feeding back into the line and the power absorbed by the braking effect.

Other objects, features and advantages of the invention will appear or be pointed out as the description proceeds.

In the drawings forming a part hereof, and in which like reference characters denote corresponding parts in all the views.

The Triodyne has three poles located at intervals of 120 electrical degrees. An "electrical degree" is the 360th part of the angle through which a conductor on the armature moves during a complete voltage cycle in that conductor. In the simplest form of the invention there are three poles, a reaction pole, a line pole, and a control pole. In such a machine the electrical degrees are equal to the mechanical degrees around the axis of the armature shaft. The Triodyne can be built with multiples of three poles however, and in a six-pole machine there are two reaction poles, two line poles, and two control poles; and the armature turns through 720 electrical degrees in making one revolution. The armature carries a lap winding, and on a three pole machine the equivalent of a diameter winding is a winding the pitch of which is one-third of the circumference of the armature.

Figures 1, 2, 3, 4:
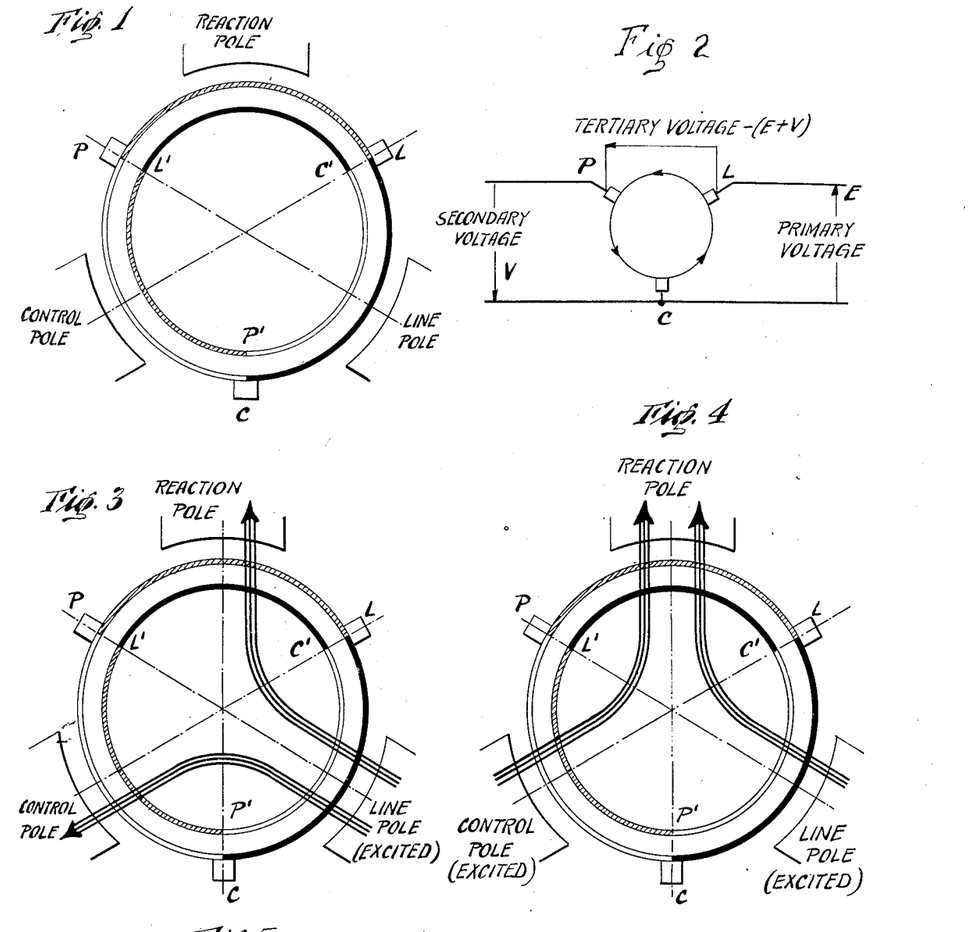
Fig. 1 is a diagrammatic view of the Triodyne showing the brushes dividing the armature windings into three branches.
Fig. 2 is a diagram illustrating which voltages are available between the respective brushes of the Triodyne.
Fig. 3 is a diagram view similar to Fig. 1, showing the magnetic field of the Triodyne when only the line pole is excited.
Fig. 4 is a view similar to Fig. 3, but showing the field distribution when both the line pole and control pole are excited.
Figure 5:
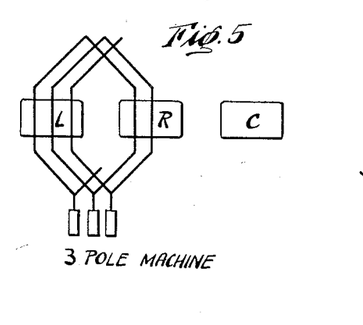
Fig. 5 is a fragmentary wiring diagram illustrating the armature winding on a three pole machine.

The Triodyne has three brushes L, C, and P located between the poles as shown in Fig. 1. These brushes divide the armature winding in three branches, each one of them with a section in the upper and one in the lower layer of the armature winding as shown in Fig. 1. Fig. 2 shows the external connections with the three available voltages, E, V and $-(E+V)$. Usually E will be constant and V variable. Changes of the voltage E will change the speed, but not the ratio E to V. The secondary voltage V is supplied to the motor that the Triodyne controls in the description that follows, but it will be understood that the tertiary voltage can be used in the same way.

The line pole is excited by the line voltage. Fig. 3 shows the field distribution when no other excitation is used. The voltage E is induced between the brushes L and C. E is the counter E. M. F. for the line voltage. The secondary voltage V shows up between the brushes C and P.

The sections of the armature are indicated by the brushes between which they lie. The sections of the upper layer of the armature are indicated by the legends LC, CP, and PL; the sections of the lower layer by the legends L'C', C'P', and P'L'. The field has correct direction for the sections LC and CP in the upper layer and L'C' and C'P' in the lower layer, but the voltages induced in PL and P'L' sections cancel each other; therefore, E equals V and the tertiary voltage $-(E+V)$ is zero. This field distribution of Fig. 3 will be referred to as field (1–2) because the Triodyne generates the voltages E and V, that is, the primary and secondary voltage.

In Fig. 4 the line pole and the control pole are both excited. If the control pole is fully excited, the field (1–2) distribution changes to that shown in Fig. 4. With this field distribution no voltage is induced between the brushes C and P, that is, the secondary voltage V equals zero, but the tertiary voltage has its maximum value $-E$. Consequently, this field distribution shall be called field (1–3).

The counter E. M. F. E has not been affected and, therefore, the speed of the Triodyne does not change.

If the armature carries current, this armature current tends to weaken the field under all poles if the field distribution is (1–3). The diminished field under line and reaction pole would cause the armature to run faster. The change under the control pole influences the control of the secondary voltage V. This armature reaction can be completely compensated by placing series compensation windings on the reaction pole and on the control pole. The winding on the reaction pole has to be excited by the current from the P brush and the winding on the control pole carries the current of the L brush. If the change under the control pole is not objectionable, a compensation winding on the reaction pole is sufficient to hold the Triodyne at constant speed. Change of field under the control pole causes variation in the secondary and tertiary voltage.

The Triodyne will take automatically only as much energy from the line that the secondary demand, the losses and the mechanical load on the shaft are satisfied at a speed which is determined by the field through the sections CL and C'L' of the armature and this field may be kept constant independent of control operation. More generally, it may be stated, that the Triodyne has four ways to take or deliver energy; electrically over the three voltages E, V and $-(E+V)$ and mechanically over the shaft. Energy may be impressed on the armature on one, two or three of these routes and taken off at the rest of them. It is not necessary to use all four of them. It is an advantage that the Triodyne can take care of its ventilation simply as a mechanical load on the shaft and takes just enough more current from its electrical supply to satisfy this demand.

Figure 6:
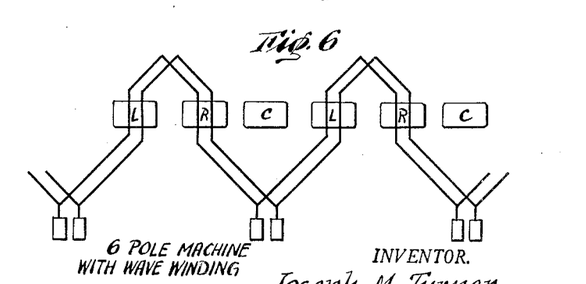
Fig. 6 is a fragmentary wiring diagram illustrating a wave winding applied to a six pole machine.
Figures 8, 9:
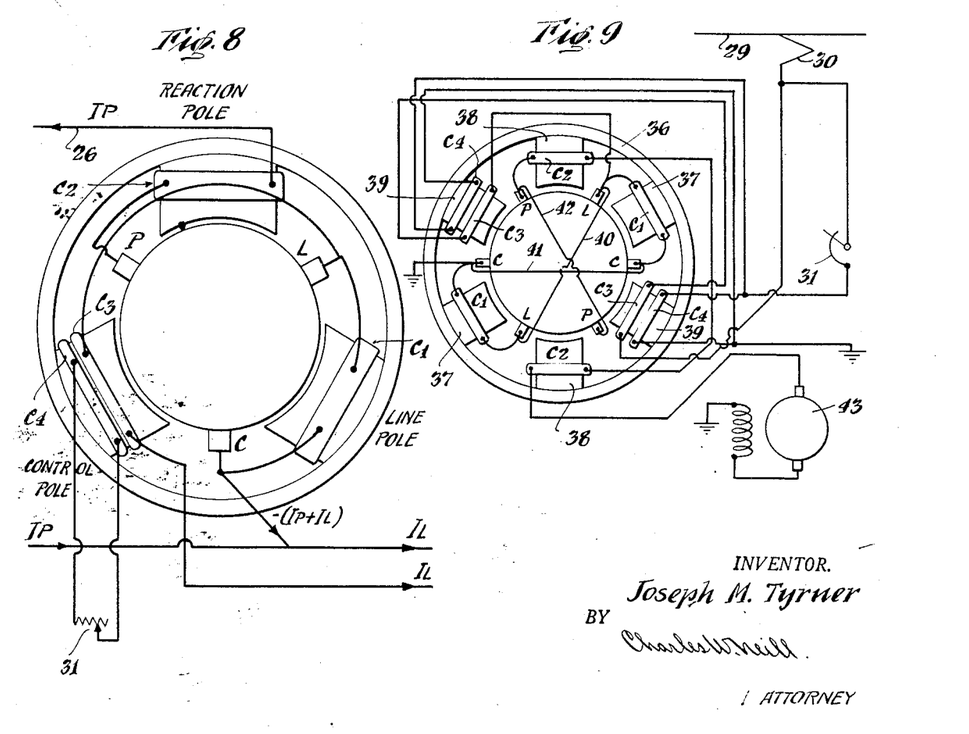
Fig. 8 is a side elevation of a modified form of the Triodyne shown in Fig. 7.
Fig. 9 is a wiring diagram illustrating a combination of a motor with a six pole Triodyne that controls the motor.

In all the figures of the drawings, except Figs. 6 and 9, the armature is shown with three poles corresponding to a two pole D. C. machine. But machines with any multiple of three such as six, nine and so on are feasible. Machines with more than three poles have the advantage that they have an equalized magnetic pull on the armature. Six and nine pole machines may have only three brushes if the armature has a wave winding, but six or nine brushes with other windings. When there are six brushes there are 2 L (line) brushes, 2 C (control) brushes, and two P (potentiometer) brushes, but the ultimate circuits are equivalent of that represented in Fig. 2. The expression "multiple of three" is used to include three pole and three brush machines, three being the value equal to three multiplied by the whole number one.

The line branch of the Triodyne has all the characteristics of a shunt field motor. Therefore, the Triodyne may be started in the same way and with the same means as a shunt field motor.

Figure 7:
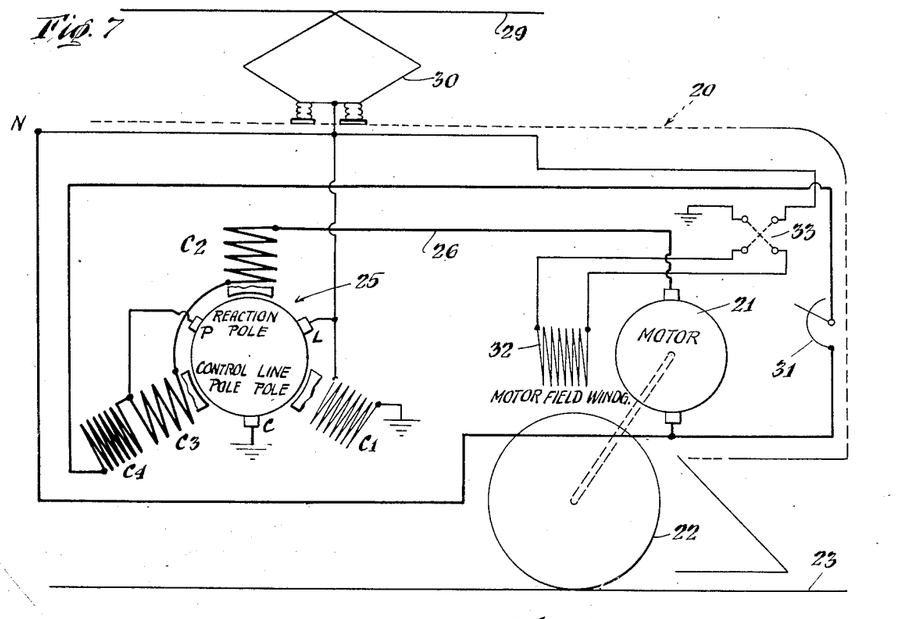
Fig. 7 is a diagrammatic illustration of an electric locomotive with the motor controlled by the apparatus of this invention.

Fig. 7 is a diagrammatic illustration of a self-propelled, electric railway unit 20 driven by a motor 21 that is connected through motion transmitting connections with traction wheels 22 running on rails 23. For greater simplicity in the drawings, a single wheel 22 is shown and only a portion of the body of the railway unit 20 is illustrated.

One side of the armature of the motor 21 is connected with a Triodyne 25 by conductor 26. The other side of the motor 21 is grounded. Power is supplied to the Triodyne from a third rail or overhead catenary 29. The element 30 is representative of means conducting electricity from a third rail or catenary to the railway unit, such means being usually a shoe for contact with a third rail or a pantograph for operation along a catenary. The pantograph 30 supplies power to the brush L, and through a control rheostat 31 to a control coil C4 on the control pole of the Triodyne.

The control coil C4 has its other side connected with the P pole. A compensating coil C3, also located on the control pole, is in series with a speed compensating coil C2 wound around the reaction pole of the Triodyne. The coils C3 and C2 are also in series with the P brush of the Triodyne so that the power supplied to the motor 21 passes from the P brush, through the compensating coils C3 and C2, to the conductor 26. The C brush of the Triodyne is grounded.

Power is supplied from the pantograph 30 to the coil $C_1$ on the line pole of the Triodyne, and to the field winding 32 of the motor 21. There is a reversing switch 33 between the pantograph 30 and the motor field winding 32.

With this circuit the speed of the motor 21 can be controlled by varying the resistance of the control rheostat 31 which is located in the control cab of the railway unit 20. The voltage supplied by the Triodyne 21 is uni-directional, but the motor 21 can be reversed by shifting the reversing switch 33 which is in series with the motor field winding 32. This connection of the motor field winding 32 directly across the power line provides a simple means for reversing the motor 21, but with the Triodyne circuit illustrated in Fig. 7, the motor 21 still has the starting characteristics of a series motor. The reason for this is that the compensating coil C3, being in series with the armature of the motor 21, is affected by the load and counteracts the excitation produced by the control coil C4 in such a way that it reduces the secondary voltage as the load on the secondary circuit is increased.

The railway unit 20 has simple and effective regenerative braking controlled by the rheostat 31. Whenever this rheostat 31 is adjusted so that the resultant excitation of the control pole produced by the coils C3 and C4 results in a Triodyne secondary voltage lower than the back E. M. F. of the motor 21, power is fed back from the motor 21, through the Triodyne 25, to the power line 29. The control rheostat 31 may be moved to reduce the secondary voltage of the Triodyne to zero so that any rotation of the motor 21 will feed back power to the line. It will be apparent, to those skilled in the art, that various other circuits may be used to obtain a wide variety of torque and regenerative braking control.

Fig. 8 shows a Triodyne somewhat similar to that shown in Fig. 7, but in which the compensating coil C3 is not in series with the load. This wiring of the Triodyne makes the secondary voltage substantially independent of the load. When using the Triodyne of Fig. 8 with a self-propelled railway unit, the conductor 26 would be connected with a series wound motor.

Fig. 9 shows a six pole Triodyne 36 wired so as to obtain the same characteristics as the three pole Triodyne of Fig. 8. This machine has two line poles 37, two reaction poles 38, and two control poles 39. The corresponding poles are located on opposite sides of the machine. This six pole machine has one outstanding advantage over the three pole machine of Fig. 8 in that it has magnetic balance.

The coils C1, C2, C3 and C4 of the Triodyne shown in Fig. 9 correspond with the similarly designated coils of Fig. 8. Power is supplied from a line 29 through a conductor 30 to one of the coils C3 on the right hand control pole 39. This coil C3 is preferably connected in series with the corresponding coil C3 on the other control pole 39, and after passing through the second coil C3, the current flows to the upper brush L and then into the armature. The upper and lower brushes L are connected in parallel by a conductor 40.

Coils C1 on the line poles 37 are connected with the line through the coils C3 of the control poles 39, just as in the case of the three pole machine shown in Fig. 8. The C brushes of the six pole Triodyne are connected in parallel by a conductor 41.

The coils C2 on the reaction poles 38 are in series with one another, but a conductor 42 connects the P brushes in parallel.

Control of the secondary voltage of the Triodyne is effected by varying the current flowing in the coils C4 located on the control poles 39. These coils C4 are connected in parallel across the power line, but in series with the control rheostat 31. The coils C4 can, of course, be connected in series if the Triodyne is designed for a different voltage.

Since the compensating coils C3 on the control poles 39 maintain the secondary voltage substantially constant in spite of changes in the load, the motor 43 is shown as a series-wound motor so as to obtain high starting torque.

Figures 10, 11:
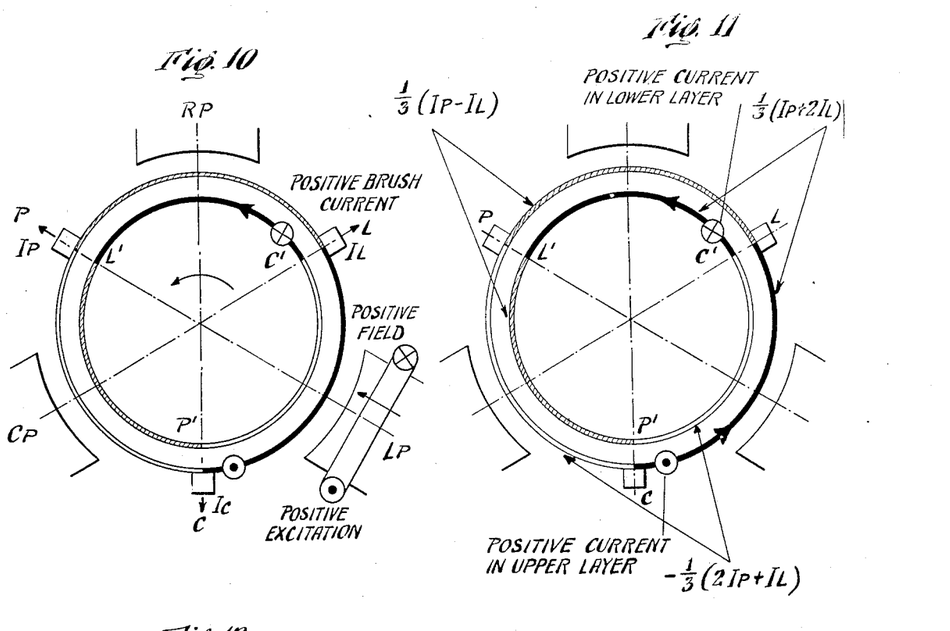
Fig. 10 is a schematic view of the Triodyne indicating the positive directions of the magnetic field and current.
Fig. 11 is a view similar to Fig. 10 but illustrating the different currents in the upper and lower layers of the armature winding.

Fig. 10 shows a schematic view of the Triodyne indicating the positive directions of field, currents and so on. It is necessary to be very consistent in the definition of the positive sense of the different items in order to avoid confusion.

The field shall be positive if its lines of force are coming out of the pole, that is, if the pole is a north pole. Excitation is positive if it produces such a field. With counter-clockwise rotation, this field will induce, in the indicated winding sections, positive E. M. F. in the direction from brush C to brush L. This E. M. F. would be a counter E. M. F. if the line voltage is impressed on the brushes C and L. The voltage E which will be used in the equations and which is shown in Fig. 2 is the counter E. M. F. and not the line voltage. The brush current shall be positive if it leaves the brush.

We may write:

$$\text{voltage } \overline{CL} = E$$
$$\text{voltage } \overline{LP} = -E - V \quad (1)$$
$$\text{voltage } \overline{PC} = +V$$

according to the second law of Kirchhoff $$\overline{CL} + \overline{LP} + \overline{PC} = 0 \quad (2)$$

Since the brushes divide the armature winding into six sections; three sections in the upper layer in which the voltages $E_{CL}$, $E_{LP}$ and $E_{PC}$ are induced and three lower sections with the voltages, $E_{C'L'}$, $E_{L'P'}$, and $E_{P'C'}$.

It is evident that $$E_{CL} = -C_{P'C'}$$
$$E_{LP} = -E_{C'L'} \quad (3)$$
$$E_{PC} = -E_{L'P'}$$

and we may write $$2(E_{CL} + E_{LP} + E_{PC}) = 0 \quad (4)$$

or $$E_{LP} = -(E_{CL} + E_{PC}) \quad (4a)$$

The voltages induced between the brushes are $$+E = E_{CL} - E_{LP}$$
$$+V = E_{PC} - E_{CL} \quad (5)$$
$$-(E+V) = E_{LP} - E_{PC}$$

These three equations may be reduced to two using Equation 4a $$E = 2E_{CL} + E_{PC}$$
and
$$-V = E_{CL} - E_{PC} \quad (6)$$

or equations for $E_{CL}$, $E_{PC}$ and $E_{LP}$ $$E_{CL} = \tfrac{1}{3}(E - V)$$
$$E_{PC} = \tfrac{1}{3}(E + 2V) \quad (7)$$
$$E_{LP} = \tfrac{1}{3}(-V - 2E)$$

Considering the positive current as coming out of the brush and according to the first law of Kirchhoff $$I_L + I_P + I_C = 0 \quad (8)$$

or $$I_C = -(I_L + I_P) \quad (8a)$$

Obviously at least one of the currents has to enter its brush.

In the three branches between the brushes, the three branch currents $I_{CL}$, $I_{LP}$ and $I_{PC}$ are flowing.

If no internal current is flowing in the armature, we have $$I_{CL} + I_{LP} + I_{PC} = 0 \quad (9)$$

or $$-I_{PC} = I_{CL} + I_{LP} \quad (9a)$$

According to the first law of Kirchhoff $$I_L = I_{CL} - I_{LP}$$
$$I_P = I_{LP} - I_{PC} = 2I_{LP} + I_{CL} \quad (10)$$
$$I_C = I_{PC} - I_{CL} = 2I_{CL} - I_{LP} = -(I_L + I_P)$$

and therefore $$I_{LP} = \tfrac{1}{3}(I_P - I_L)$$
$$I_{PC} = -\tfrac{1}{3}(2I_P + I_L) \quad (11)$$
$$I_{CL} = \tfrac{1}{3}(I_P + 2I_L)$$

In Fig. 11, the three branches of the armature winding with their upper and lower sections are shown and it can be seen that the upper and lower layer under a pole carry different currents. We may combine these two currents to a fictitious current A flowing in a fictitious one-layer winding. The six sections of the original winding have N/6 conductors each if the armature circumference has N conductors. The fictitious winding has N/6 conductors between two adjacent brushes and has only N/2 conductors on the whole circumference. These fictitious currents are $$A_{CL} = I_{CL} - I_{PC} = I_P + I_L$$
$$A_{LP} = I_{LP} - I_{CL} = -I_L \quad (12)$$
$$A_{PC} = I_{PC} - I_{LP} = -I_P$$

Figure 12:
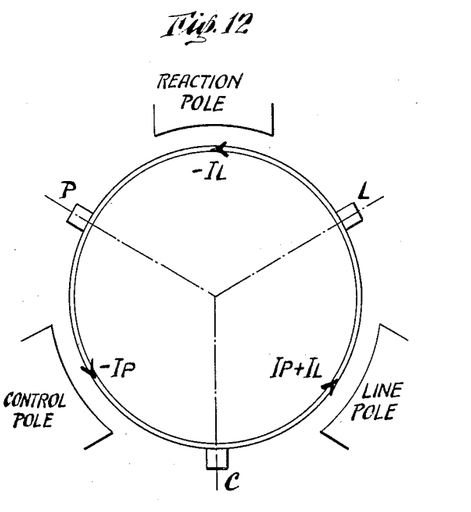
Figs. 12 and 13 are diagrams showing the flow of current in fictitious windings for the purpose of illustrating the equations of the Triodyne.

They are shown in their proper sections of the fictitious winding in Fig. 12.

Figure 13:
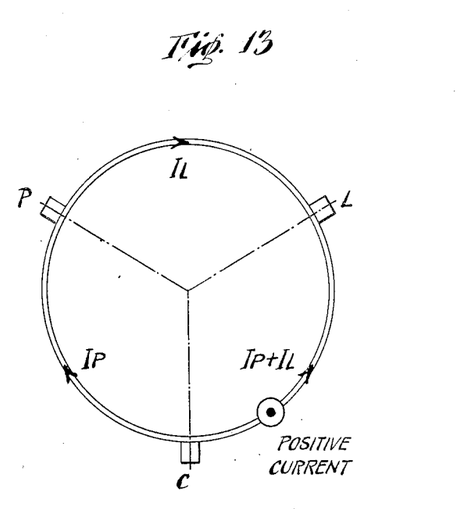

The positive currents flow counter-clockwise. Taking the signs of the currents into consideration, the currents flow according to Fig. 13 if all brush currents would be positive, that is, coming out of the armature. Actually, at least one current has to enter its brush—that is, it would be negative.

It has been pointed out that the compensation of the armature field is essential to keep the speed of the converter constant and to control the voltage supplied by the Triodyne to the motor that it controls.

Figure 14:
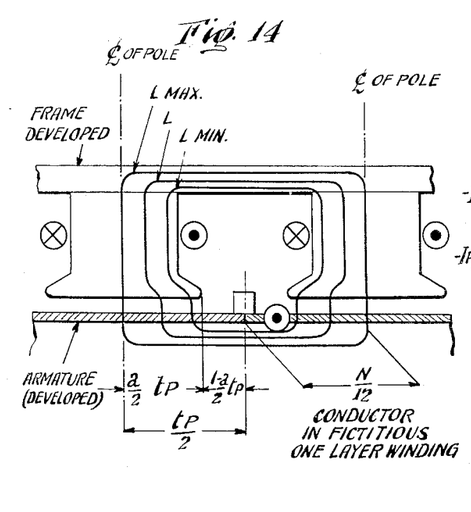
Fig. 14 is a development of the armature circumference into a straight line for illustrating the relation of the conductors and the magnetic field.

In Fig. 14, the circumference of the armature is developed into a straight line. Two adjacent poles and the brush between them are shown. The armature winding is represented by a layer of current which changes its value at the location of the brush. The armature field is represented by three lines of forces: L max. through the centers of the poles, L min. through the tips of the poles and a line L between them. The pole pitch is $t_P°$ and the pole arc $at_P$. A coil with indication of the positive sense of excitation is shown on the pole. Comparing it with the positive sense for the armature current, we find that the positive excitation on the right hand pole counteracts the armature reaction, but cooperates with it on the left hand pole.

Figure 15:
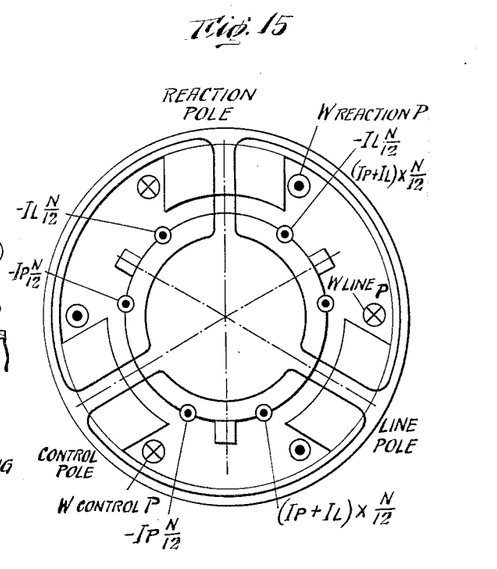
Fig. 15 is a diagram showing the positions and relations of compensating windings.

The line L max. embraces the maximum of ampere wires on the armature. We find that line L max. embraces two sections of N/12 conductors with two different fictitious currents as marked in Fig. 15. The line L min. through the pole tips embraces a minimum amount of excitation which is only $(1-a)$ of that embraced by L max. The average amount of excitation is embraced by the line L which embraces $(1-a/2)$ N/12 conductors (see Fig. 11). All lines embrace the excitation W provided by the compensation windings on adjacent poles. W is equal to the number of turns in the compensation winding times the current flowing in these turns and is designated with the pole name as index. We can write for the lines L $$W_{\text{Line } P} - W_{\text{Reaction } P} = (I_P + I_L) + $$
$$-(I_L)N/12(-a/2) \quad (13)$$
$$W_{\text{Reaction } P} - W_{\text{Control } P} = (-I_L) + $$
$$(-I_P)N/12(1-a/2)$$
$$W_{\text{Control } P} - W_{\text{Line } P} = (-I_P) + $$
$$(I_P + I_L)N/12(1-a/2)$$

or $$W_{\text{Line } P} - W_{\text{Reaction } P} = I_P \, n/12(1-a/2)$$
$$W_{\text{Reaction } P} - W_{\text{Control } P} = -(I_P + I_L) \quad (13a)$$
$$N/12 \, (1-a/2)$$
$$W_{\text{Control } P} - W_{\text{Line } P} = I_L \, N/12(1-a/2)$$

These equations are satisfied for $$W_{\text{Line } P} = 0$$
$$W_{\text{Reaction } P} = -I_P N/12(1-a/2) \quad (14)$$
$$W_{\text{Control } P} = I_L N/12(1-a/2)$$

These equations may be interpreted that on the reaction pole there should be an excitation equivalent to $$-I_P N/12(1-a/2) \quad (15)$$

and on the control pole an excitation equivalent to $$I_L N/12(1-a/2) \quad (15a)$$

Figure 16:
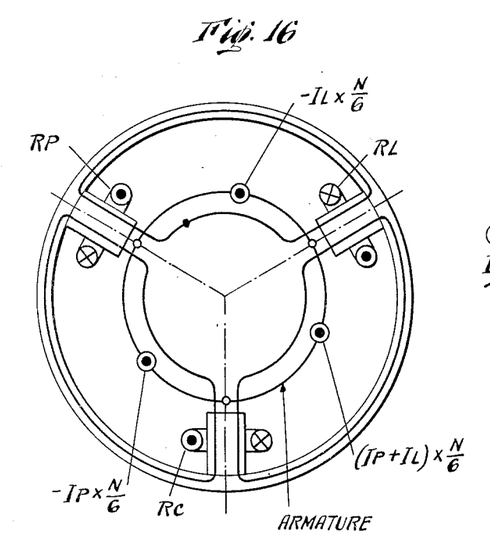
Fig. 16 is a diagram showing the armature field under interpoles.

For improving the commutation it is advantageous to use interpoles (Fig. 16), and the armature field under these interpoles can be found in a similar way to the procedure employed above.

$$R_L - R_P = -I_L N/6$$
$$R_P - R_C = -I_P N/6 \qquad (16)$$
$$R_C - R_L = (I_P + I_L) N/6$$

and these equations are satisfied by $$R_L = -I_L N/6$$
$$R_C = I_P N/6 \qquad (17)$$
$$R_P = 0$$

The armature field under the interpoles may be counteracted by excitation on the interpoles belonging to the brushes C and L.

Figure 17:
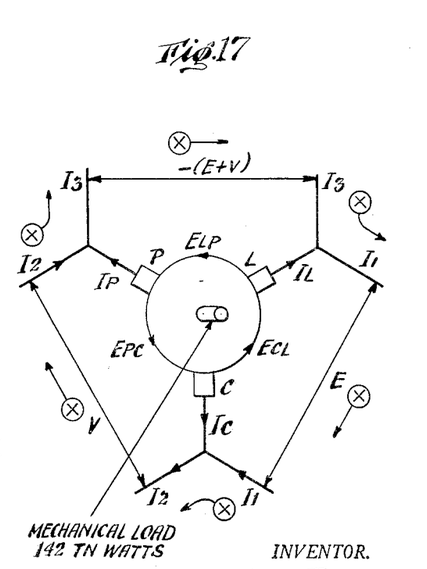
Fig. 17 is a diagram illustration of the voltages and currents for the most general case of the Triodyne.

The most general case of the Triodyne is depicted in Fig. 17. In three ways electrical energy may be drawn from or delivered to the armature as three voltages are available designated as primary, secondary and tertiary voltage. The fourth way is the mechanical load on the armature shaft with torque T ft./lbs. at $n$ R. P. M. Measured in watts, this load figures $.142\ Tn$ and it may be delivered from the shaft as a motor torque or put into the machine as a generator torque.

The torque developed by one pole is proportional to the flux of that pole which, in turn, is proportional to the E. M. F. generated under this pole. The second factor determining the torque is the current on the surface of the armature; therefore, the pole between the brushes X and Y creates a torque proportional to $E_{XY} \times A_{XY}$, where X and Y represent any two poles of the Triodyne, E is the voltage between these brushes, and A is the current between these same brushes.

It is not essential but advantageous to use the fictitious current A instead of the two currents I in the upper and lower layer of the armature winding.

The product $E_{XY} \times A_{XY}$ is measured in watts. If $T_{XY}$ is the torque in foot pounds at $n$ R. P. M., we may write $$E_{XY} \times A_{XY} = .142\ T_{XY}\ n\ \text{watts} = M_{XY} \qquad (18)$$

This mechanical energy is M watts or $1.341\ M\ 10^3$ horsepower available on the shaft, but it has to take care of all the windage losses and all the losses in the iron too.

Three voltages are impressed on the armature and they may be defined so that they take care of the IR drop in the machine; that means that the three voltages E, V and $(E-V)$ are obtained by deducting all IR drops from the impressed voltages.

The mechanical energy of the Triodyne is then $$M = E_{CL} A_{CL} + E_{LP} A_{LP} + E_{PC} A_{PC} \qquad (19)$$

We have found (see (7))

$$E_{CL} = \tfrac{1}{3}(E-V)$$
$$E_{LP} = -\tfrac{1}{3}(V+2E) \qquad (7)$$
$$E_{PC} = \tfrac{1}{3}(E+2V)$$

and (see (12))

$$A_{CL} = I_P + I_L$$
$$A_{LP} = -I_L \qquad (12)$$
$$A_{PC} = -I_P$$

By substituting into Equation 17 we get $$M = \tfrac{1}{3}(E-V)(I_P + I_L) - (-2E) \qquad (20)$$
$$(-I_L) + (E + 2V)(-I_P)$$
$$= \tfrac{1}{3}(EI_P + EI_L - VI_P - VI_L + VI_L +$$
$$2EI_L - 2VI_P - EI_P)$$
$$= EI_L - VI_P$$

The most general case of the Triodyne is represented by the network Fig. 17.

The currents $I_P$, $I_L$ and $I_C = -(I_L + I_P)$ are split into the three currents $I_1$, $I_2$ and $I_3$. But if we consider $$I_L = I_1 - I_3 \qquad (21)$$

and $$I_P = I_3 - I_2$$

we receive $$I_L + I_P = I_1 - I_2 \qquad (22)$$

we may well interpret it as $$I_L = I_1 - X$$
$$I_P = I_2 + X \qquad (23)$$

X being the current $I_3$ which does not enter the armature and flows as the arrows X indicate.

The circuit E with current $I_L$ and the circuit with current $I_P$ represent, therefore, the electric energy balance of the Triodyne.

In Equation 20 we found $$M = EI_L - VI_P \qquad (20)$$

We have to watch that E and V are voltages generated in the armature and that $I_L$ and $I_P$ are positive if coming out of their brush.

When electric energy is impressed on the primary circuit and electric energy is taken out of the secondary circuit with line current $I_{line}$ and line voltage $E'_{line}$ which we get after deducting the IR drop from the line voltage $E_{line}$ we have $$I_{line} = -I_L \qquad (24)$$
$$E'_{line} = -E$$

and we can transform Equation 20 into $$M = E'_{line} I_{line} - VI_P \qquad (25)$$

E' line is fixed and cannot be changed. V is adjusted by means of the control excitation. $I_P$ depends on the external secondary circuit.

$I_{line}$ adjusts itself automatically to take care of the mechanical load such as a cooling fan and the losses which are encountered in rotating electrical machinery. If the converter would have no losses, and would change V into $E'_{line}$ we should have $$I_P = I_{line} \frac{E'_{line}}{V} \qquad (26)$$

in which case $M = 0$.

The preferred embodiment, and some modifications of the Triodyne have been disclosed, but other modifications can be made, and some features can be used without others without departing from the invention as defined in the claims.

What is claimed is:

1. The combination with an electric motor that has a field winding connected across a power line, and an armature with brushes for conducting power to the armature circuit; of a motor controller comprising a rotary converter including 3 field pole structures for each 360 electrical degrees, an armature with 3K pole structures, said armature having a winding with a pitch of 120 electrical degrees 3K' brushes, K and K' each being a whole number, and said armature being wound to generate a secondary voltage across two brushes P and C and a tertiary voltage across two brushes L and P when the line voltage is impressed across the brushes L and C, and conductors for connecting the P and C converter brushes with the brushes on opposite sides of the armature circuit of the motor.

2. A power controller comprising field windings and an armature, each with 3K pole structures and K' brushes in the armature circuit, K and K' being whole numbers, the distance from one pole structure to the next adjacent pole structure being 120 electrical degrees around the circumference of the armature and field, said armature having a winding with a pitch of 120 electrical degrees and including conductors in such relation to the pole structures that the armature is driven as a motor by the power impressed across certain brushes and generates a secondary voltage across a different group of brushes, connections for putting a load in the circuit with said different group of brushes, and means controlling the field excitation to regulate the secondary voltage.

3. A motor controller comprising a rotary converter for connection in series between a power line and at least the armature portion of a motor circuit, said converter comprising an armature having 3K pole structures and a winding with a pitch of 120 electrical degrees, a field structure having 3 pole structures for each 360 electrical degrees and between which the armature has relative movement, and 3K' brushes, including P, C, and L brushes, the L and C brushes of which are connected with the line, and the C and P brushes of which have conductors for connection with the motor circuit, the values of K and K' being whole numbers.

4. A power controller comprising 3 field pole structures for each 360 electrical degrees, an armature that turns with respect to the field and that has a winding with a pitch of 120 electrical degrees, 3K' brushes in circuit with conductors of the armature under the different pole structures, the value of K' being a whole number, and the brushes including P, C, and L brushes; conductors for connecting the L and C brushes with a power line, conductors for connecting the C and P brushes with a circuit to be controlled, windings by which variations in the excitation of a field pole structure controls the voltage generated across the C and P brushes, and means for varying the excitation of the said field pole structure.

5. A power controller comprising 3 field pole structures for each 360 electrical degrees, an armature that turns with respect to the field pole structures and on which there is a winding with a pitch of 120 electrical degrees, 3K' brushes in circuit with conductors of the armature under the different poles, the values of K and K' being whole numbers, and the brushes including P, C, and L brushes; conductors for connecting the L and C brushes with a power line, conductors for connecting the C and P brushes with a circuit to be controlled, windings by which variations in the excitation of K field pole structures controls the voltage generated across the C and P brushes, means for varying the excitation of the said K field pole structures, and compensating windings on another K field pole structure for maintaining the armature speed substantially constant in spite of variations in the load of the controlled circuit.

6. A power controller comprising a field structure having 3 pole structures for each 360 electrical degrees, an armature having a winding with a pitch of 120 electrical degrees and having 3K pole structures and N conductors, 3K' brushes from some of which voltage for a secondary circuit is available when power is impressed upon certain of said brushes, an exciting winding on K field pole structures for connection with a power line and for determining the speed of the armature when no current is flowing in response to the secondary voltage, the field pole structures also including K control pole structures and K reaction pole structures, control-pole windings for determining the secondary voltage, reaction-pole windings for maintaining the speed of the armature substantially constant in spite of variations in current that flows in the secondary circuit, the control-pole windings being such as to produce an excitation substantially equal to $$-I_P \frac{N}{12K}\left(1-\frac{a}{2}\right)$$

and the reaction-pole winding being such as to produce an excitation substantially equal to $$I_L \frac{N}{12K}\left(1-\frac{a}{2}\right)$$

where $I_L$ = current flowing from the power line
$I_P$ = current in the secondary circuit
$N$ = number of conductors on armature
$a$ = % of pole structure arc actually employed for the face of the field pole structure, and
$K$ and $K'$ = whole numbers.

7. A power controller comprising a rotary converter including an armature on which is a winding with a pitch of 120 electrical degrees, 3 field pole structures and 3 armature pole structures for each 360 electrical degrees, 3K' brushes including P, C, and L brushes, the L and C brushes being connected with a power line and the C and P brushes supplying power for a circuit that is to be controlled, K and K' being whole numbers, control windings on K field pole structures for controlling the voltage generated between the C and P brushes, and other windings that counteract the effect of armature reaction on the field generated by said control windings to prevent the armature reaction from changing the voltage generated between the C and P brushes.

8. A power controller comprising a rotary converter including an armature on which is a winding with a pitch 120 electrical degrees, 3 field pole structures for each 360 electrical degrees, 3K armature pole structures, 3K' brushes including P, C, and L brushes, the L and C brushes being connected with a power line and the C and P brushes supplying power for a circuit that is to be controlled, K and K' being whole numbers, control windings on K field pole structures for controlling the voltage generated between the C and P brushes, compensating windings on K other field pole structures for holding the speed of the converter constant, other windings on the K pole structures with the control windings and in series with one of the brushes for compensating changes in armature reaction so as to prevent variation in the voltage across the C and P brushes.

9. The combination with a rotary converter that has an armature on which is a winding with a pitch of 120 electrical degrees, and that has three brushes in circuit with the armature winding, the first and second brushes having conductors for connection with a power line for receiving power to drive the converter, the second and third brushes being in position to receive unidirectional power generated by the converter, of a motor circuit that includes a field winding and an armature circuit, conductors connecting the armature circuit with said second and third brushes of the converter, other conductors connecting the motor field winding directly with the power line to which the first and second brushes of the converter are connected, and a reversing switch between the motor field winding and said power line.

10. The combination with a rotary converter that has an armature on which is a winding with a pitch of 120 electrical degrees, and that has three brushes, the first and second brushes having conductors for connection with a power line for receiving power to drive the converter, the second and third brushes being in position to receive power generated by the converter, of a motor that has a field winding and an armature circuit, conductors connecting the armature circuit with said second and third brushes of the converter, other conductors connecting the motor field winding directly with the power line to which the first and second brushes of the converter are connected, a control coil on the converter for determining the voltage of the power across the second and third brushes, and a compensating coil associated with the control coil and dimensioned and disposed to influence the field of the control coil and reduce the voltage impressed on the motor as the motor load increases so that the motor has series characteristics.

11. Control apparatus for a self-propelled railway unit having traction wheels, and a motor connected with the traction wheels for driving them, the combination with said motor of a rotary converter comprising a field structure including a line pole piece, a control pole piece, and a reaction pole piece, which pole pieces are located at intervals of 120 electrical degrees and at least some of which have windings thereon, an armature that turns with respect to said pole pieces in the magnetic field generated by current flowing in the field windings on said pole pieces, said armature being wound with a pitch of 120 electrical degrees, three brushes in circuit with different portions of the armature, a conductor for connecting the first brush of the converter with a power line or third rail, a conductor for connecting the third brush with one side of the armature circuit of the motor, conductors for grounding the other side of the armature circuit and the second brush of the converter, an exciting current winding on the line pole piece and connected with the line, an impedance, a control winding on the control pole piece connected to the line in series with said impedance, conductors for connecting the motor field directly across the power line or third rail, and an adjustment device for varying the impedance to change the voltage impressed upon the armature circuit of the motor.

12. A power controller comprising a rotary converter having 3 field pole structures for each 360 electrical degrees, 3K armature pole structures and 3K' brushes, the value of K and K' being whole numbers, the armature having a winding with a pitch of 120 electrical degrees and the brushes including P, C, and L brushes so positioned that a line voltage impressed across the L and C brushes drives the converter and causes it to generate a secondary voltage across the C and P brushes, and a tertiary voltage across the P and L brushes, terminals to which a load circuit can be joined to connect said load circuit across either the secondary or tertiary voltage of the controller, a field winding for determining the ratio of secondary to tertiary voltage in proportion to the current flow in said field winding.

13. A power controller for a motor circuit that operates under varying loads, said controller comprising a rotary converter with 3 field pole structures for each 360 electrical degrees, 3K armature pole structures and K' brushes, where K and K' are whole numbers, said armature having a winding with a pitch of 120 electrical degrees and said brushes including P, C and L brushes and the L and C brushes having conductors for connection with a power line, and the C and P brushes being connected with the motor circuit, control windings on the converter for controlling the secondary voltage generated between the C and P brushes, means for regulating the current supply to the control windings to regulate voltage supplied to the motor circuit, and circuits through the converter of such a nature that back voltage from the motor circuit in excess of the secondary voltage of the converter feeds back power through the converter to the power line.

14. A power controller comprising a rotary converter that includes 3K armature pole structures, an armature on which there is a winding with a pitch of 120 electrical degrees, 3 field pole structures for each 360 electrical degrees and on which there are N conductors, and compensating windings on at least K field pole structures for maintaining the speed of the converter substantially constant in spite of variations in the secondary load, said compensating windings being of such a nature and in such position in the circuit that it produces an excitation substantially equal to $$I_L \frac{N}{12K}\left(1-\frac{a}{2}\right)$$

where $I_L$ is the current flowing from the power line, K is a whole number, and $a$ is the percentage of the pole arc actually employed for the faces of the field pole structures on which the compensating windings are wound.

15. A power controller comprising a rotary converter that receives power from a power line at a primary voltage and delivers power at an independent secondary voltage to a circuit to be controlled, said converter including an armature having a winding with a pitch of 120 electrical degrees, 3 field pole structures for each 360 electrical degrees, and compensating windings on at least one of said field pole structures for maintaining the converter speed substantially constant.

JOSEPH M. TYRNER.